United States Patent [19]

Wulf et al.

[11] Patent Number: 5,028,800
[45] Date of Patent: Jul. 2, 1991

[54] TWO-BEAM PHOTOMETER USING SPECIFIC BEAM CHOPPER ARRANGEMENT

[75] Inventors: Jurgen Wulf; Werner Lahmann, both of Uberlingen, Fed. Rep. of Germany

[73] Assignee: Bodenseewerk Perkin Elmer GmbH, Uberlingen, Fed. Rep. of Germany

[21] Appl. No.: 537,964

[22] Filed: Jul. 19, 1990

[30] Foreign Application Priority Data

Aug. 7, 1989 [DE] Fed. Rep. of Germany ....... 3926090

[51] Int. Cl.$^5$ ............................................. G01N 15/06
[52] U.S. Cl. ..................................... 250/575; 356/325
[58] Field of Search ............... 250/571, 575, 347, 351; 356/323, 325, 434

[56] References Cited

U.S. PATENT DOCUMENTS

| | | | |
|---|---|---|---|
| 2,683,220 | 7/1954 | Gross | 356/325 |
| 3,393,603 | 7/1968 | Harrick | 356/325 |
| 4,329,048 | 5/1982 | Capitini et al. | 356/323 |
| 4,453,225 | 6/1984 | Ford . | |

FOREIGN PATENT DOCUMENTS

| | | |
|---|---|---|
| 0084391 | 5/1987 | European Pat. Off. . |
| 1291533 | 3/1969 | Fed. Rep. of Germany . |
| 2147142 | 10/1974 | Fed. Rep. of Germany . |
| 2836492 | 3/1980 | Fed. Rep. of Germany . |
| 2949438 | 6/1980 | Fed. Rep. of Germany . |
| 2905230 | 8/1980 | Fed. Rep. of Germany . |
| 2303533 | 3/1984 | Fed. Rep. of Germany . |
| 3347603 | 12/1984 | Fed. Rep. of Germany . |
| 2539184 | 8/1986 | Fed. Rep. of Germany . |
| 3539667 | 5/1987 | Fed. Rep. of Germany . |
| 148385 | 1/1985 | German Democratic Rep. . |
| 242089 | 1/1987 | German Democratic Rep. . |
| 2182785 | 5/1987 | United Kingdom . |

OTHER PUBLICATIONS

Bruckner, C. "AAS3-A New Absorption Spectrophotometer" East Germany, *Feingeratetechnik*, vol. 34, No. 6 pp. 262-264, Jun. 1985.

*Primary Examiner*—David C. Nelms
*Assistant Examiner*—Khaled Shami
*Attorney, Agent, or Firm*—Thomas P. Murphy; Edwin T. Grimes

[57] ABSTRACT

In a double-beam photometer comprising a light source providing a light beam, detector means, a sample area, optical means for guiding the light beam as a measuring light beam through the sample area onto the detector means, means for guiding the same light beam as a reference light beam onto the detector means while avoiding the sample area, and chopper means disposed in a splitting location for splitting the light beam into the measuring light beam, which are combined into one path of rays in a recombination location, after the measuring light beam has passed through the sample area, with the splitting location and the recombination location being spatially close to each other. The chopper means has a single chopper which simultaneously effects the splitting and the combination of the measuring and reference light beams.

15 Claims, 6 Drawing Sheets

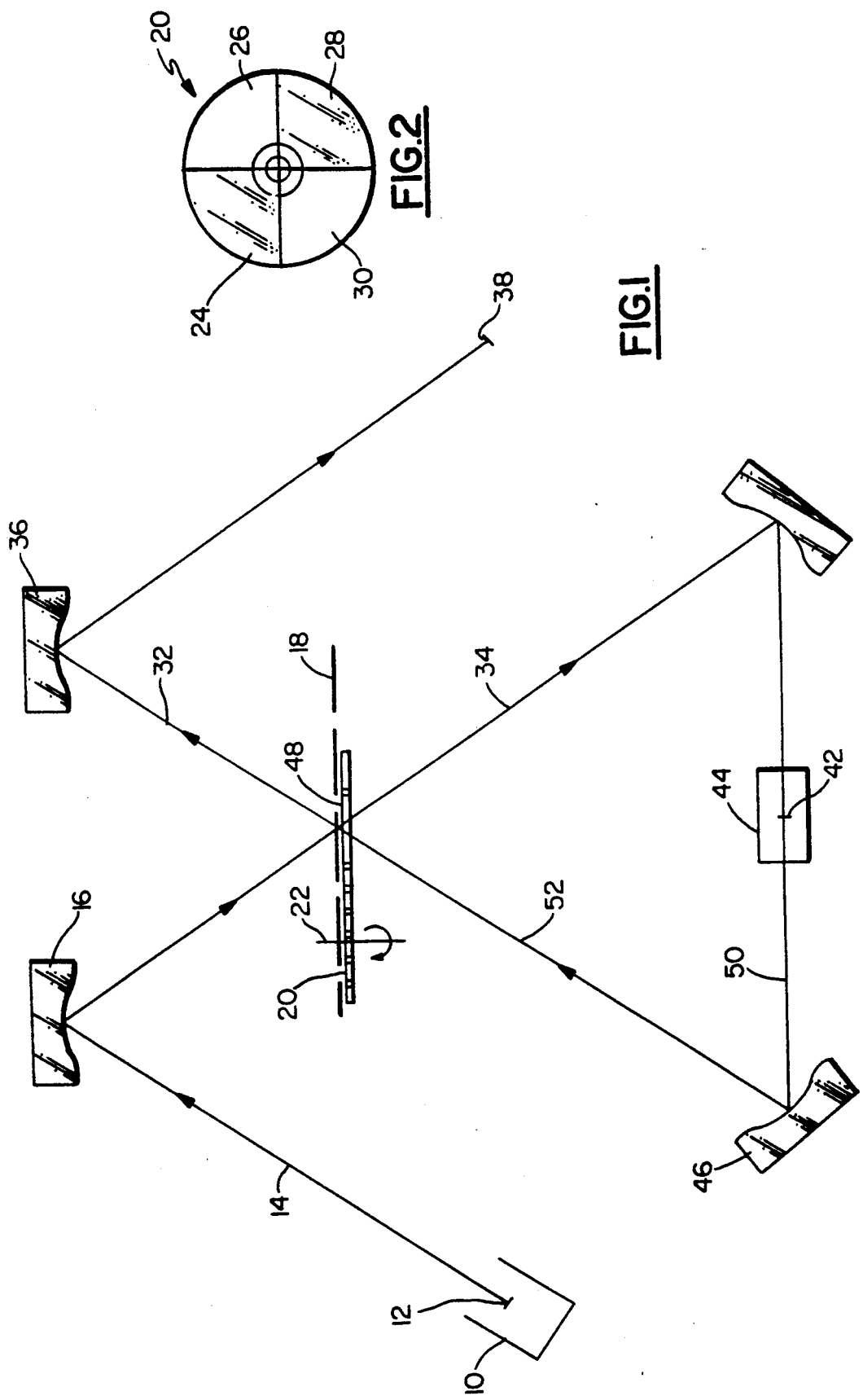

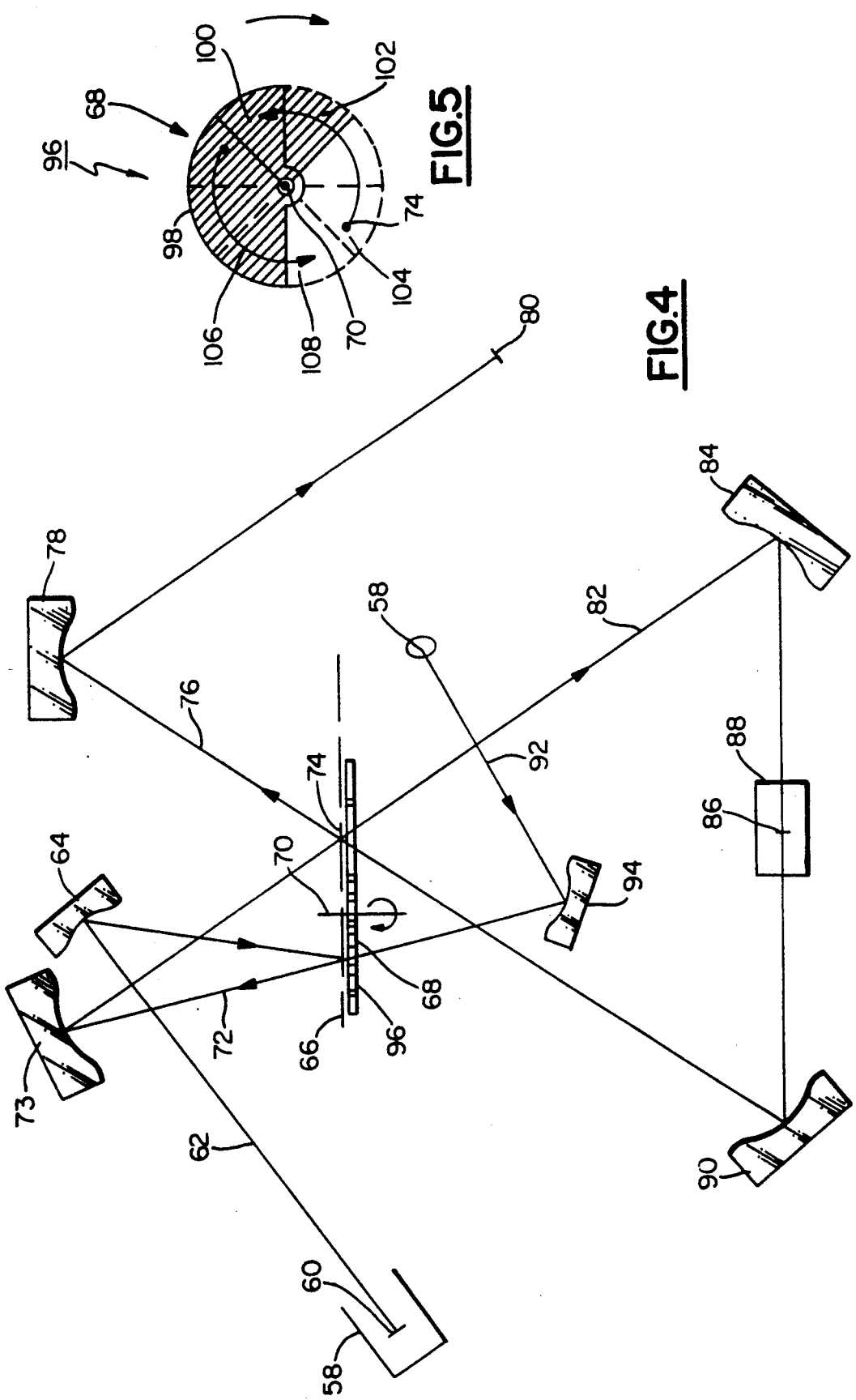

TWO-BEAM PHOTOMETER USING SPECIFIC BEAM CHOPPER ARRANGEMENT

TECHNICAL FIELD

The invention relates to a double-beam photometer, comprising a light source; detector means; a sample area; optical means for guiding a light beam originating from the light source as measuring light beam through the sample area onto the detector means; means for guiding the same light beam as reference light beam onto the detector means while avoiding the sample area; and chopper means in the measuring and reference light beams for splitting the path of rays of the light beam which originates from the light source in a splitting location into a path of rays of the measuring light beam and into a path of rays of the reference light beam, with these paths of rays being recombined into one path of rays in a recombination location after the measuring light beam has passed through the sample area.

In photometers, particularly in spectrophotometers, it is necessary to eliminate the influence in either the variations of the lamp luminosity or the detector sensitivity. In some photometers, it is also necessary to compensate for the influence of solvents, or the like, on the absorption measurement. Because of this reason, double-beam photometers are provided. Two light beams are generated which originate from a light source: a measuring light beam is guided over or through a sample and is absorbed by this sample, for example, while a reference light beam is guided along a reference path of rays, bypassing the sample, and is not influenced by the sample. Both light beams are alternatingly passed onto one and the same detector. Then, variations in either the lamp luminosity or in the detector sensitivity influence the signals generated by the two light beams in the same way. In signal processing, such influences may be eliminated, e.g., by forming ratios.

BACKGROUND ART

DE-B-1 126 157 shows a double-beam spectrophotometer with a single chopper, i.e., a circulating beam interrupter. Two light beams originate from a common light source. One of the light beams transmits in a measuring path of rays through a measuring cuvette, the other light beam transmits in a reference path of rays through a reference cuvette. By means of the chopper, the two light beams are superimposed onto a common path of rays, with the measuring and reference light beams being alternatingly guided by the chopper onto a common path of rays. The measuring and reference light beam which simultaneously nest into each other in one path of rays impinge on a common detector. The absorption measurement is made by optical alignment by means of a comb diaphragm in the reference path of rays.

Indeed, only one chopper is present. However, the measuring and reference light beams originate from the light source into different directions, and are therefore from the beginning not identical. In some light sources, e.g., a hollow cathode lamp in the atomic absorption spectral photometry, the generation of two such light beams running in different directions is impossible.

U.S. Pat. No. 3,924,950 shows an atomic absorption spectrophotometer with a measuring light beam and a reference light beam. The measuring light beam passes through a sample area. There, a flame or a furnace is provided as an atomizing device. The reference light beam bypasses the sample area. In this double-beam photometer, a single light beam originates from the light source, a hollow cathode lamp. This light beam is split by a beam splitter into two partial light beams having a fixed intensity ratio. The beam splitter forms a "splitting location". By means of a second beam splitter, or rather "beam combiner", the measuring light beam, which was passed through the sample area, and the reference light beam, are again recombined. The second beam splitter forms a "recombination location". The light beam generated by this superimposition supplies a monochromator and a detector. The monochromator and the detector can together be designated as "detector means". A single chopper alternatingly interrupts the measuring light beam, the reference light beam, or both light beams.

In this arrangement, considerable light losses occur through the beam splitter. The chopper does not have the function to split or to recombine light beams but only effects an alternating interruption.

EP-A2-0 014 357 describes a double-beam changing light colorimeter in which the measuring bean coming from a lighting optic is alternatingly deflected by means of a control organ and stationary mirrors onto a first measuring cuvette and, subsequently, through a second measuring cuvette onto a common photo-element. The control organ is a mirror which can be moved into the path of rays of the measuring beam and which deflects the measuring beam generated by the light source by 90°.

Here, the movable mirror causes a changeover between the measuring and the reference path of rays. However, there is no recombination of the measuring and the reference light beam.

EP-B1-0 084 391 shows another arrangement having mirrors which can be moved into the path of rays. There, also, the recombination is made by a movable mirror.

DE-C2-23 03 533 shows an atomic absorption spectrophotometer which is designed as a double-beam apparatus with a measuring path of rays containing an atomized sample substance and a reference path of rays. The apparatus described there is also designed to take into consideration background absorption. The apparatus comprises a line-emitting first light source which emits the resonant line of an element which is to be measured. Further, the apparatus comprises a second light source which emits a continuous spectrum. Optical systems generate light beams which originate from the first and second light sources, respectively, and the beam axes of which intersect each other. A monochromator selects a limited spectral range containing the resonant line from the entire, continuous spectrum. Then, the measuring and reference light beams impinge upon a detector. In a predetermined and cyclic succession of four consecutive intervals, a chopper arrangement passes the light beam from the line-emitting first light source through the measuring and reference path of rays, and the light beam from the light source providing a continuous spectrum through the measuring and reference path of rays onto the monochromator and the detector. There, the chopper arrangement is provided with two chopper discs which are equiaxially spaced in an axial distance and circulate together. Both chopper discs are optically arranged in front of the measuring and reference path of rays in the area of the intersecting points of the beam axes of the light beams originating from the two light sources. Reflecting and transparent surfaces are arranged on the chopper discs so that only one of the light beams, originating from the light sources, is guided to one of the path of rays (measuring or reference path of rays).

DE-A-20 56 112 shows a double-beam photometer with two choppers for separating and recombining the measuring and reference light beams. There, the problem of the synchronization of the two choppers occurs.

DE-A-19 11 048 shows a chopper arrangement with a rotating sector mirror by which the light beam originating from a hollow cathode lamp is passed once into a measuring path of rays and once into a reference path of rays. The sector mirror is also provided with a mirror sector on its side remote from the hollow cathode lamp. A deuterium gas discharge lamp is arranged behind the sector mirror and emits a continuous spectrum. The light originating from this deuterium lamp is reflected by the back of the sector mirror into the reference path of rays into which the light from the hollow cathode lamp transmits from another position of the sector mirror. In a transmission position of the sector mirror, the light from the hollow cathode lamp transmits in the usual way into the reference path of rays, while, in another transmission position of the sector mirror, light transmits from the deuterium gas discharge lamp into the measuring path of rays and the reference path of rays is covered by a covering diaphragm.

DISCLOSURE OF THE INVENTION

It is the object of the invention to simplify the construction of a double-beam photometer of the above-mentioned type and to improve the synchronization of the beam splitting and the recombination in the chopper arrangement.

According to the invention, this object is achieved by a construction wherein: the splitting location and the recombination location are spatially close to each other; and the chopper means is a single chopper which simultaneously effects the splitting and the recombination of the measuring and reference light beams. Thus, the beam splitting as well as the recombination of the path of rays is made by the chopper. The measuring and reference light beams are generated from a single light beam originating from the lamp. Only a single chopper is required to effect the beam splitting as well as the recombination.

BRIEF DESCRIPTION OF THE DRAWINGS

FIG. 1 Shows the path of rays of a double-beam photometer with a single chopper.

FIG. 2 Shows the chopper in the embodiment according to FIG. 1.

FIG. 4 Shows the path of rays in a double-beam photometer in which, by means of a single chopper, a measuring light beam from a hollow cathode lamp, a reference light beam from the hollow cathode lamp, and a light beam from a deuterium lamp emitting a continuum are alternatingly passed onto the entrance slit of a monochromator.

FIG. 5 Shows the chopper in the embodiment according to FIG. 4.

DESCRIPTION

Figure 3:
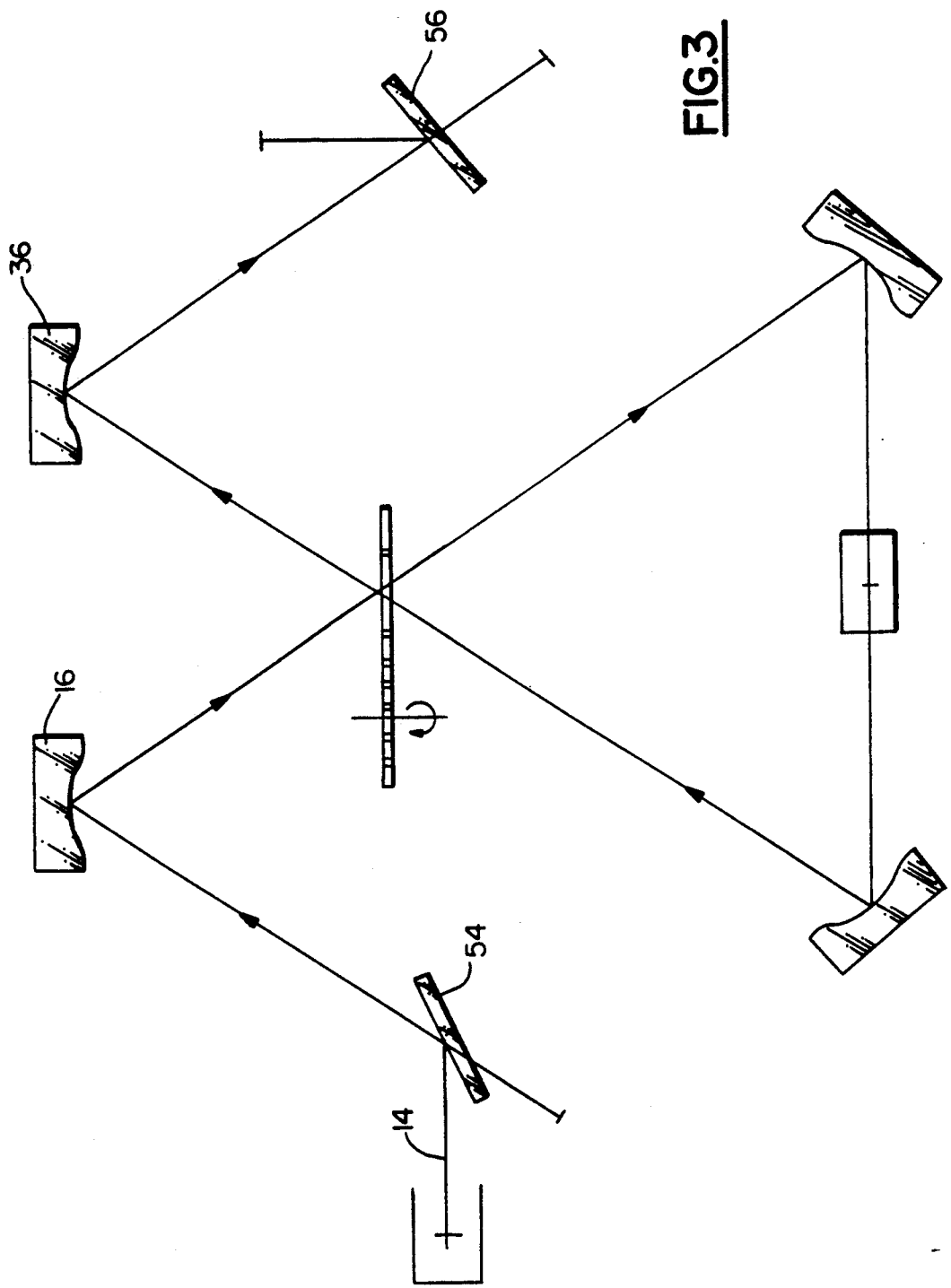
FIG. 3 Shows the path of rays in a modified embodiment of the double-beam photometer according to FIG. 1, with the chopper also being designed according to the type of FIG. 2.

In FIG. 1, numeral 10 designates a hollow cathode lamp. The hollow cathode lamp 10 is a line-emitting light source which, in atomic absorption spectrophotometry, emits the resonant lines of an element looked for in a sample. The hollow cathode lamp 10 generates a light spot 12 having a diameter of 6 mm, for example. A light beam 14 originates from the hollow cathode lamp 10. The light beam 14 is deflected by a first concave mirror 16 and is focused on a plane 18, and there generates a reduced image of the light spot 12 having a diameter of 3 mm, for example. A chopper 20 is arranged in the plane 18. The chopper rotates about an axis 22. The chopper has four sectors of 90° each. Sectors 24 and 28 are reflecting, and sectors 26 and 30 are transparent to the light of the hollow cathode lamp 10. As can be seen in FIG. 2, the reflecting sectors and the transparent sectors alternate. The light beam 14 impinging on the chopper 20 under an angle relative to the plane 18 is alternatingly reflected at the chopper 20 as a reference light beam 32 or transmitted as a measuring light beam 34 through the chopper 20.

The reference light beam 32 is deflected by a second concave mirror 36 and is focused onto the entrance slit of a monochromator (not illustrated). Thereby, a second image 38 of the light spot 12 of the hollow cathode lamp is generated. The path of rays is symmetrical to the path of rays from the light spot 12 through the mirror 16 to the light spot on the chopper 20. Therefore, the light spot 38 has the same diameter as the light spot 12, i.e., a diameter of 6 mm, for example.

The measuring light beam 34 is deflected by a third concave mirror 40 and is focused onto a light spot 42. Thereby, the light spot having a diameter of 3 mm is reduced to a light spot having a diameter of 1.5 mm. The light spot 42 is located in a sample area 44. This sample area 44 can enclose a flame which atomizes a sample solution for the atomic absorption spectrophotometry. However, the sample area 44 can also be the interior of a furnace for electrothermal atomization of samples. A concave mirror 46 again deflects the measuring light beam and again focuses it in the plane 18 on the chopper 20 as a light spot 48 having a diameter of 3 mm in the chosen example.

The light spot 48 of the measuring light beam 34 coincides with the light spot which is generated by the light beam 14 in the plane 18 of the chopper 20. The path of rays of the light beam 14 and the reference light beam 32 is "M"-shaped. The path of rays of the measuring light beam 34 below the chopper 20 forms an equilateral triangle. The light spot 42 generating an image of the luminous spot 12 is located in the center of the side 50 of this triangle, opposite to the chopper 20. The measuring light beam 34 naturally extends behind the chopper 20 when the sector of the chopper 20 on which the light beam 14 impinges is transparent, in the extension of the light beam 14. The measuring light beam 34, which is guided through the concave mirror 46 from below, in FIG. 1, onto the chopper, forms a side 52 of said triangle and is aligned with the reference path of rays 32 reflected by the chopper 20.

In the location of the light spot 38, the entrance slit of a monochromator (not illustrated) is provided. The light emerging from the exit slit of this monochromator is passed in the usual way onto a photoelectric detector. The described arrangement operates as follows:

When a transparent sector 26 or 30 of the chopper 20 is in the path of rays of the measuring light beam 14, the light beam 14 is transmitted as measuring light beam 34 through the chopper 20. Then, the path of the light extends from the luminous spot 12 of the hollow cathode lamp 10 onto the concave mirror 16, through the chopper 20 onto the concave mirror 40. From there, the light beam transmits through the sample area 44 to the concave mirror 46, with the light beam being reduced to a very small diameter. The concave mirror 46 deflects the light beam through the chopper 20 onto the concave mirror 36. The concave mirror 36 focuses the light beam onto the entrance slit of the monochromator. Thus, the light beam forms a measuring light beam which transmits through the sample area 44. In the atomic absorption spectrophotometry, the light beam is selectively absorbed in the sample cavity 44 by the atoms of a looked-for element, the resonant lines of which correspond to the spectral line emitted by the hollow cathode lamp 10. The monochromator chooses from these spectral lines one line each which is suitable for the measurement.

With the further rotation of the circulating chopper 20, one of the reflecting sectors 24 or 28 comes into the path of rays of the measuring light beam 14. Therefore, the impinging light beam 14 is reflected at the chopper as a reference light beam 32. Then, the light beam passes from the luminous spot 12 through the concave mirror 16, the reflecting sector 24 or 28 of the chopper 20, and the concave mirror 36 to the entrance slit of the monochromator. In this path of rays, the light beam bypasses the sample area 44. Therefore, the reference light beam 32 is not influenced by the sample and can serve to compensate for the influences of variations in either the lamp luminosity or the detector sensitivity. With the circulation of the chopper 20, the measuring light beam influenced by the sample and the reference light beam which is not influenced by the sample alternate with a frequency of twice the rotational speed of the chopper 20. The measuring light beam 34 extending from the concave mirror 46 to the concave mirror 36 generates a light spot 48 of the same magnitude as the light spot which the light beam 14 generates at this location. The axes of the transmitting measuring light beam 34 and the reflected reference light beam 32 coincide. Consequently, there is a beam superimposition onto a common path of rays.

In the above-described arrangement, there is a common path of rays for the measuring and reference light beam which extends from the hollow cathode lamp 10 through the concave mirror 16 up to the chopper 20. Here, a beam splitting into the measuring light beam 34 and the reference light beam 32 is effected. However, the chopper 20 simultaneously effects a beam superimposition of the transmitting measuring light beam 34 which extends after its passage through the sample area 44 along the side 52 of the triangle, and the reflecting reference light beam 32. Behind the chopper 20, a common path of rays for the measuring light beam 34 and the reference light beam again results which extends from the chopper 20 through the concave mirror 36 to the entrance slit of the monochromator. The "measuring path of rays" contains a "triangle" lying between these common paths of rays. The "reference path of rays" is reduced to zero: the reference light beam only runs through the two common paths of rays. A single chopper 20 is provided for the splitting and the recombination of the two light beams. Here, in the area of the side 52 of the triangle at one and the same location, i.e., on the tip of the "triangle", the chopper acts on the "advancing" light beam 14 as well as on the "returning" measuring light beam 34.

FIG. 3 shows that the hollow cathode lamp 10 and the entrance slit of the monochromator do not necessarily have to be located at the ends of an "M"-path of rays. The hollow cathode lamp 10 can be arranged at the location, as illustrated there, parallel to the direction of the measuring light beam in the sample area 44. The light beam 14 originating from the hollow cathode lamp 10 is deflected by a plane mirror 54 in the direction onto the first concave mirror 16. Correspondingly, the light beam in the recombined path of rays can also be deflected behind the second concave mirror 36 by a plane mirror 56 so that the light beam impinges on the entrance slit of the monochromator in a direction perpendicular to the side 50 of the triangle.

Moreover, the double-beam photometer of FIG. 3 is constructed in a fashion similar to the double-beam photometer of FIG. 1. Corresponding parts are designated by the same numerals.

FIG. 4 shows an atomic absorption spectrophotometer designed as a double-beam apparatus in which, in a further phase of the cycle, a light beam from a deuterium lamp 58 is passed into the path of rays, allowing compensation for the background absorption.

In FIG. 4, numeral 58 designates a hollow cathode lamp which generates a luminous spot 60. A light beam 62 originates from the luminous spot 60 of the hollow cathode lamp. The light beam 62 is caught by a concave mirror 64. The concave mirror 64 deflects the light beam 62 and focuses it on a plane 66. In the plane 66, a chopper 68 is arranged which rotates about an axis 70. The chopper 68 has reflecting and transparent sectors as will be explained herein below with reference to FIG. 5.

When the light beam 62 impinges on a reflecting sector, it is reflected in the direction 72 onto a concave mirror 73. The concave mirror 73 deflects the light beam 62 and focuses it for a second time on a point 74 on the chopper 68, relative to the axis 70, diametrically opposite side of the chopper 68.

When the surface of the chopper 68 is also reflecting on the point 74, the light beam is guided as the reference light beam 76 onto a concave mirror 78, in a way similar to the way illustrated in FIG. 1. The concave mirror 78 deflects the reference light beam 76 and generates a light spot 80 as the third image of the luminous spot 60 of the hollow cathode lamp 58. There, the entrance slit of a monochromator (not illustrated) is again arranged.

When, during the reflection, the surface of the chopper 68 in the point 74 is transparent on the diametrically opposite side, as hitherto the case, the light beam 72 transmits through the chopper 68 as the measuring light beam 82. The measuring light beam 82 impinges on a concave mirror 84. The concave mirror deflects the measuring light beam and focuses the measuring light beam 82 on a first light spot 86 in the sample area 88. The sample area 88 can again be a flame or a furnace for electrothermal atomization of samples. Behind the sample area 88, the measuring light beam 82 impinges again on a concave mirror 90. The concave mirror 90 deflects the measuring light beam 82 and again focuses it on point 74 in the plane 66. The deflection of the measuring light beam is made such that the measuring light beam from the concave mirror 90 passing through the point 74 is aligned with the reflected reference light beam 76. With respect to the measuring and reference light beam 82 and 76, the arrangement is identical to that of FIG. 1, in principle.

The deuterium lamp 58 provides a continuous spectrum. A light beam 92 originates from the deuterium lamp 58. The light beam 92 is deflected by a concave mirror 94 and is focused in the plane 66 on the point 96 which is diametrically opposite to the point 74 and on which the light beam 62 is also reflected with the reflecting sector of the chopper 68. The beam axis of this measuring light beam 82 reflected by the concave mirror 90 is aligned with the direction 72 of the light beam 62 reflected by the chopper 68.

The chopper 68 is illustrated in FIG. 5. The chopper 68 has a reflecting sector 98 extending through an obtuse angle. Adjacent thereto is an acute-angled, transparent sector 100. An acute-angled, reflecting sector 102 follows to the transparent sector 100. The remaining obtuse-angled sector 104 of the chopper 68 is transparent. When it is supposed that the chopper circulates clockwise, the rear edge of the reflecting sector 102 and the front edge of the transparent sector 100, respectively, are set off at an angle of 180° relative to the rear edge of the reflecting sector 98 and the front edge of the transparent sector 104, respectively. A part 106 of the reflecting sector 98 is located diametrically opposite to the reflecting sector 102. A part 108 of the transparent sector 104 is located diametrically opposite to the transparent sector 100.

The sequence of the light beams can be explained best by means of a kinematic reversal, i.e., when it is assumed that it is not the chopper 68 which rotates clockwise relative to the fixed points 74 and 96, but rather the points 74 and 96 which move on orbits counterclockwise relative to the fixed chopper 68. This is indicated in FIG. 5. In the illustrated position of the points 74 and 96, the light beam 62 is reflected on the point 96 by the reflecting sector 98 of the chopper 68. However, the light beam 62 reflected by the concave mirror 73 transmits in the transparent sector through the chopper 68. The light beam 62 from the hollow cathode lamp 58 is guided as measuring light beam 82 through the sample area 88 in the way described in relation to FIG. 1. With further movement, the point 74 reaches the reflecting sector 102, while the point 96 in the part 106 of the sector 98 is located on a reflecting surface. Thus, a reflection of the light beam 62 at the chopper 68 results in the point 96 at the reflecting sector 98, as well as in the point 74 at the reflecting sector 74. In this case, the light beam 62 originating from the hollow cathode lamp 58 bypasses as reference light beam 76 the sample area, as it is explained above in relation to FIG. 1.

Subsequently, both points 74 and 96 reach transparent sectors: point 74 reaches the sector 100, and point 96 moves on part 108 of the sector 104. In this position of the chopper 68, no light from the hollow cathode lamp impinges into the path of rays since there is no reflection in the point 96. Instead, the light beam 92 transmits at the point 96 through the sector 98 of the chopper 68 and is reflected by the concave mirror 73 onto the point 74. At the point 74, the measuring light beam 92 transmits through the transparent sector 100 of the chopper 68 and then passes through the "triangle" and the sample area 88 instead of through the measuring light beam 82. The reversing light beam, like the measuring light beam 82, again transmits at the point 74 through the sector 100 of the chopper, but now in the direction onto the concave mirror 78. The concave mirror passes the light beam onto the entrance slit of the monochromator in the light spot 80.

In a further phase of the rotation of the chopper 68, the point 74 again reaches the reflecting sector 98. Further, the point 96 remains in the transparent sector 104 of the chopper 68. Thus, the light beam 92 from the deuterium lamp 58 emitting a continuous spectrum again transmits at the point 96 through the chopper 68. However, this light beam 92 is reflected on the point 74 by the sector 98 of the chopper 68, i.e., it passes directly to the entrance slit of the monochromator without passing through the sample area 88.

Thus, the described arrangement provides, one after the other, during each complete rotation of the chopper, the following light beams at the entrance slit of the monochromator: line spectrum through the measuring path of rays throughout the sample area; line spectrum through the reference path of rays bypassing the sample area; continuum through the measuring path of rays throughout the sample area; continuum through the reference path of rays bypassing the sample area. The measuring and the sample path of rays result in such a way as was explained in connection with FIG. 1. However, a light beam of a light source emitting a continuum is additionally passed, for background compensation, into the path of rays with this light beam also being passed through the reference path of rays once in order also to compensate for luminosity variations in the deuterium lamp. All this is achieved by a single chopper serving as beam splitter as well as for recombining the light beams from both light sources.

Figure 6:
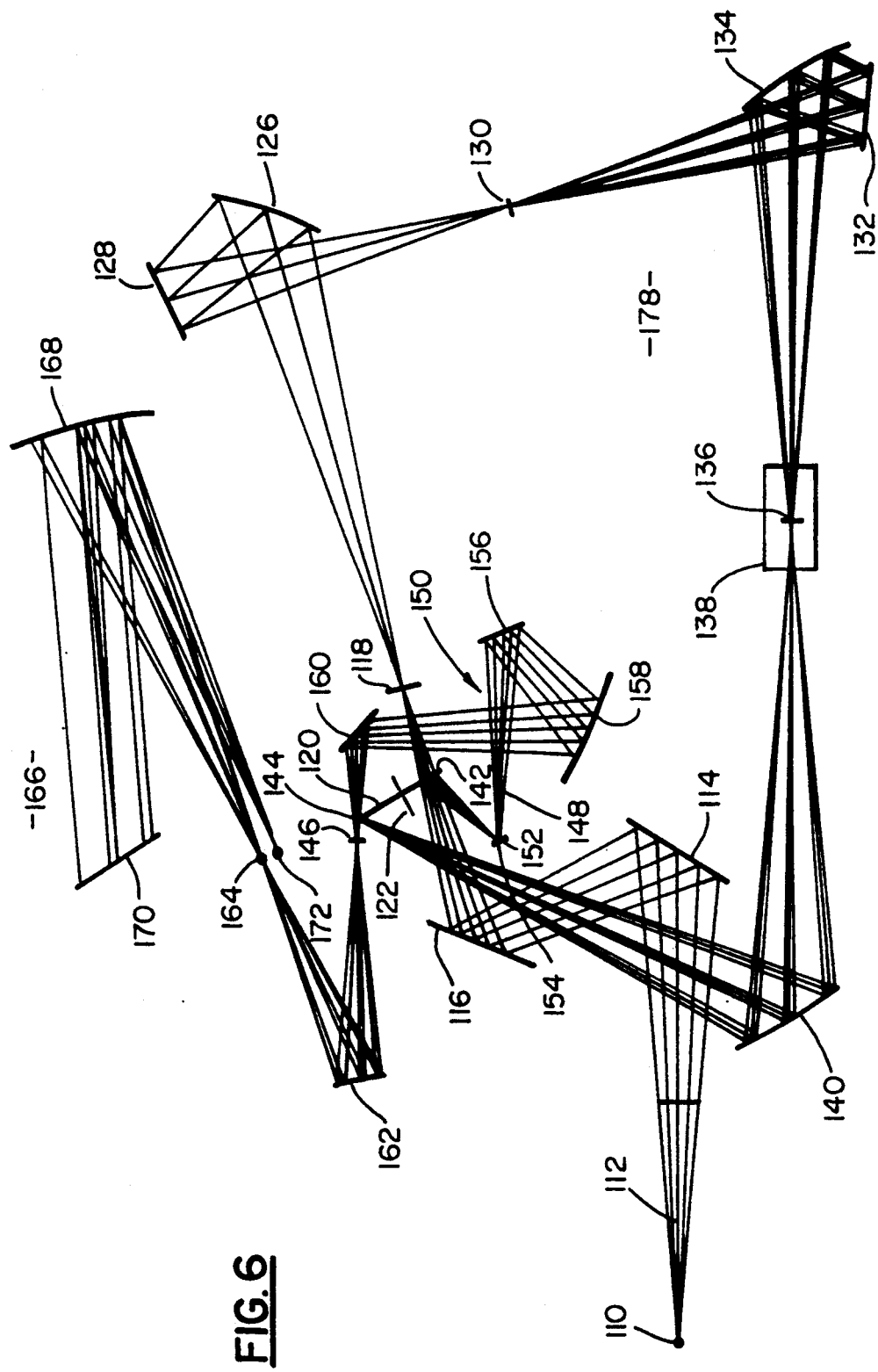
FIG. 6 Shows a further embodiment of a double-beam photometer in which, by means of a single chopper, a measuring light beam passing through the sample cavity and a reference light beam bypassing the sample cavity are alternatingly passed onto the entrance slit of a monochromator.

FIG. 6 shows another arrangement in which the beam splitting as well as the recombination of the measuring and reference light beams are achieved by a single chopper.

A divergent light beam 112 originates from a light source 110, a hollow cathode lamp, for example. The light beam 112 is deflected by a concave mirror 114, and, after a further deflection by a planar mirror 116, is focused on a point 118. The light beam 112 transmits between the planar mirror 116 and the point 118 through the chopper 120 rotating about an axis 12.

A light beam 124, which is again divergent and transmits through the chopper 120, is focused by a concave mirror 126 through a planar mirror 128 on a point 130. The light beam 124 divergently originating from the point 130 is finally guided by a planar mirror 132 onto a further concave mirror 134 which focuses the light beam 124 on a point 136. The point 136 is located in a sample area 138. Originating from the point 136, the light beam 124, which is again divergent, impinges on a concave mirror 140. The concave mirror 140 again deflects the light beam 124 onto the single chopper 120. The "precursing" light beam 112 impinges on the chopper at a location 142. The reversing light beam 124 impinges on the chopper 120 at another location 144 which is offset by an angle of 180° relative to the location 142. When the chopper 120 is reflecting at the location 144, the light beam 124 is focused by the concave mirror 140 through the chopper 120 on a point 146. The light beam 124 transmits through the sample area 138 and thus represents a measuring light beam. The path of rays through the concave mirrors 126, 134, and 140 and the planar mirrors 128 and 132 represents the measuring path of rays which comprises the sample area 138.

When the chopper is reflecting at the location 142, the light beam 112 is reflected as reference light beam 148 by the chopper 120 into a reference path of rays 150. The reference light beam 148 is focused on a point 152. This point is mirror-invertedly located to the point 118 relative to the plane of the chopper 120. A planar mirror 154 is arranged in the point 152. The planar mirror 154 reflects the reference light beam 148 onto a planar mirror 156. The planar mirror 156 reflects the reference light beam 148 onto a concave mirror 158. The concave mirror 158 focuses the reference light beam 148 through a planar mirror 160 on the point 146 when the chopper 120 is transparent at the location 144.

The point 146 is imaged by a concave mirror 162 onto the entrance slit 164 of a monochromator 166. The monochromator 166 is a grating monochromator. The monochromator comprises a concave mirror 168. The light beam entering through the entrance slit 164 is made parallel by the concave mirror 168 and is guided to a diffraction grating. The light spectrally dispersed by the diffraction grating again impinges on a concave grating 168. The concave mirror 168 generates a spectrum in the form of images of the entrance slit 164 in the plane of an exit slit 172. Then, light, having the wave length of one of the lines of the line spectrum emitted by the light source 110, emerges through the exit slit. The wave length of the light emerging through the exit slit is adjusted by moving the grating 170.

Figure 7:
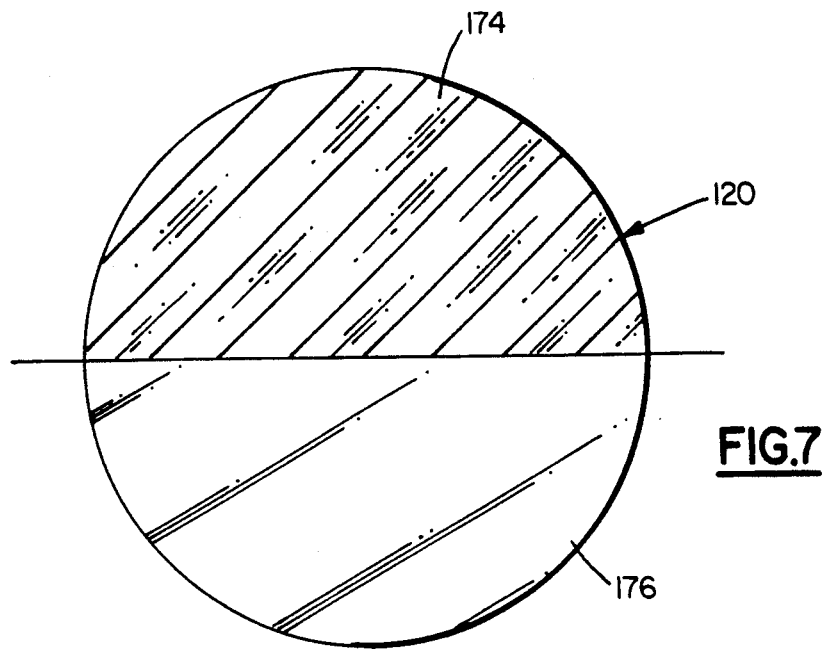
FIG. 7 Shows the accompanying chopper.

The chopper 120 is illustrated in FIG. 7. One half of the chopper 120 is provided with a mirror 174, i.e., it is reflecting. The other half 176 of the chopper 120 is transparent.

When the transparent half 176 passes the location 142 and a reflection at the mirror 174 is effected at the diametrically opposite location 144, the light beam 112 is guided as measuring light beam 124 along the measuring path of rays which is generally designated by numeral 178. However, when after half of a revolution of the chopper 120, the mirror 174 passes the location 142, and the chopper 120 is transparent at the location 142, the light beam 112 is reflected as reference light beam 148 into the reference path of rays 150. Finally, the measuring and reference light beams 124 and 148, respectively, are focused on the point 146. Behind the chopper 120, the reflected measuring light beam 124 and the transmitting reference light beam 148 are identically directed and are geometrically coincident, so that, at the location 144, a superimposition or a recombination of the measuring and reference light beams 124 and 148, respectively, is effected. One light beam 112 originating from the light source 110 is split at the location 142 into the measuring light beam 124 and the reference light beam 148. At the location 144, the measuring and reference light beams 124 and 148, respectively, are again recombined. The two locations 142 and 144 are closely adjacent. Therefore, a single chopper 120 can be used for the beam splitting and the recombination.

The above-mentioned "points", wherein the light beams are focused, actually refer to light spots, the intermediate image of a luminous spot generated by the light source, as was described in connection with FIG. 1. The double-beam photometer according to FIG. 6 has the advantage that the paths of rays are folded several times so that a space-saving arrangement results.

In the arrangement according to FIGS. 6 and 7, the measuring period during which the measuring light beam 124 impinges on the entrance slit 164 of the monochromator 166, necessarily extends through half of the period of each cycle. Thereby, the signal energy for the absorption measurement is lost. Moreover, no compensation of the background absorption is provided.

Figure 8:
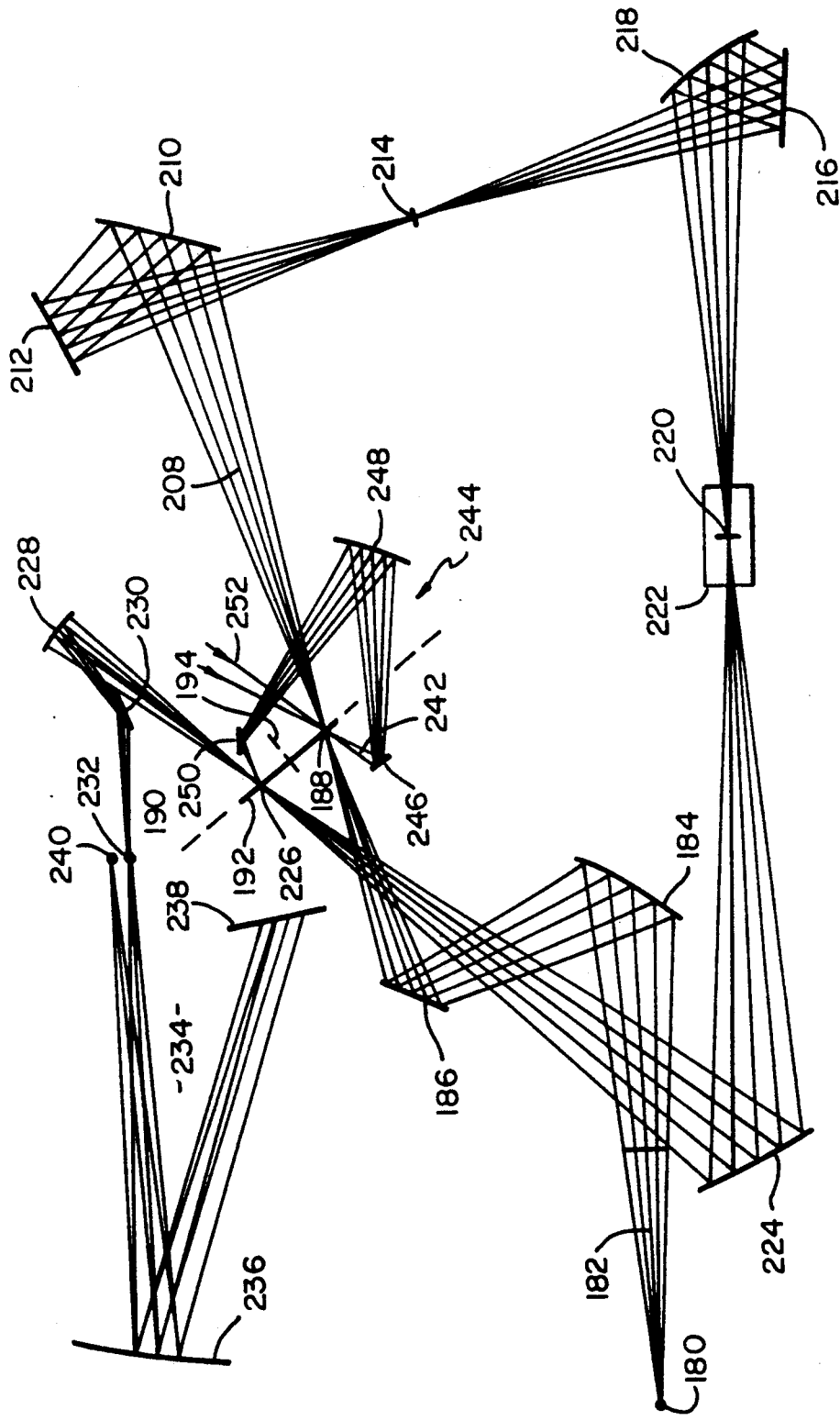
FIG. 8 Shows a double-beam photometer similar to FIG. 6, in which, by means of a single chopper, a measuring light beam originating from a hollow cathode lamp, a reference light beam originating from the hollow cathode lamp, and a light beam originating from a deuterium lamp are alternatingly passed onto the entrance slit of a monochromator.

FIG. 8 shows a folded path of rays in which the time intervals during which the light beam is passed along the measuring path of rays are substantially longer than the time intervals during which the light is passed along the reference path of rays. Moreover, in the double-beam photometer according to FIG. 8, a compensation of the background absorption is provided.

In FIG. 8, a light beam 182 originates from a light source 180, preferably from the luminous spot of a hollow cathode lamp. The light beam 182 is focused by a concave mirror 184 through a planar mirror 186 in a point 188. The point is located in a plane 190. A chopper 192 rotating about an axis 194 is provided in the plane 190.

Figure 9:
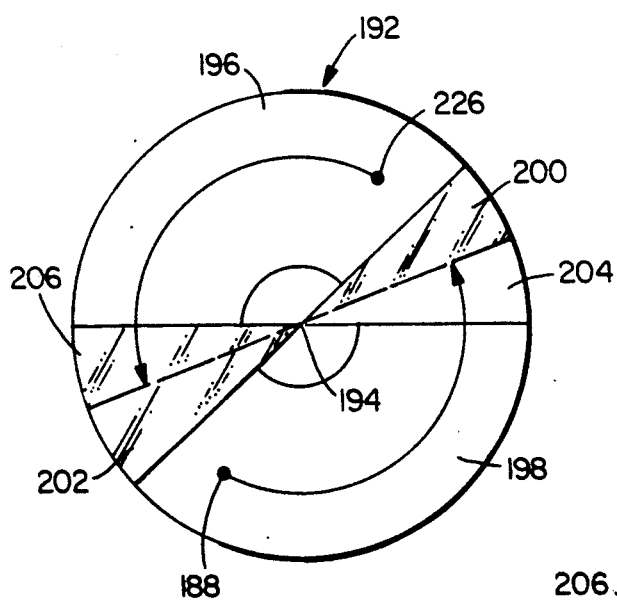
FIG. 9 Shows a chopper in the arrangement according to FIG. 8.

The chopper 192 is illustrated in FIG. 9. The chopper 192 has two transparent sectors 196 and 198 centrally symmetrically arranged relative to the axis 194. Each of the sectors 196 and 198 extends through an obtuse angle of 150°, for example. A reflecting sector 200 extending through an angle of 15°, for example, is seen in FIG. 9, clockwisely adjacent to the sector 196. A reflecting sector 202 of 15° is arranged diametrically opposite to this sector 200, i.e., it is centrally symmetrically arranged relative to the axis 194. A transparent sector 204 of again 15° is adjacent to the sector 200. The sector 204, together with the sector 198, forms a continuous, transparent sector, but because of its function is separately looked at. A reflecting sector 206 of 15° is arranged diametrically opposite of the sector 204. The sectors 202 and 206 form a continuous, reflecting sector extending through 30°, but have different functions, as will be explained below.

When the point 188 lies on the transparent sector 198, the light beam 182 transmits through the chopper 192 as measuring light beam 208 and impinges on the concave mirror 210. The measuring light beam 208 is focused by the concave mirror 210 through a planar mirror 212 in a point 214. The measuring light beam divergently originating from the point 214 impinges on a planar mirror 216. The planar mirror 216 passes the measuring light beam 208 onto a concave mirror 218. The concave mirror focuses the measuring light beam 208 on a point 220. The point 220 lies in a sample area 222. From the point 222, the measuring light beam 208 impinges on a concave mirror 224. The concave mirror 224 collects the measuring light beam 208 at a point 226 in the plane of the chopper 192. The point 226 lies, relative to the axis 194, diametrically opposite to the point 188. In this path of rays, the mirrors 184, 210, and 218 are identical components. When the point 188 lies on the transparent sector 198, the point 226 lies on the transparent sector 196 of the chopper 192. Thus, the measuring light beam 208 transmits through the chopper 192 and is focused by a concave mirror 228 through a planar mirror 230 onto the entrance slit 232 of a monochromator 234.

In principle, the monochromator 234 corresponds to the monochromator 166 of FIG. 6 with a concave mirror 236, a diffraction grating 238, and an exit slit 240.

When the chopper 192 reflects the light beam 182 on the point 188, it is passed as reference light beam 242 into a reference path of rays 244. The reference light beam 242 impinges on a planar mirror 246. The planar mirror 246 deflects the reference light beam 242 onto a concave mirror 248. The concave mirror 248 focuses the reference light beam 242 through a planar mirror 250 on the point 226. When the chopper is reflecting on this point, the reference light beam 242 is reflected onto the concave mirror 228. In this area, the reflected reference light beam 242 is geometrically identical to the transmitted measuring light beam 208.

A light beam 252 with a continuous spectrum, originating from a deuterium lamp (not illustrated), impinges on the point 188 on the chopper 192. The light beam 252 is aligned with the reference light beam 242 and, upon the chopper reflecting, is reflected in the direction of the measuring light beam 208.

Here, in a manner similar to the description of FIG. 5, when looking at the function of the double-beam photometer and the chopper 192 circular movements of the points 188 and 226 relative to the chopper 192, which is regarded as stationary, shall be looked at instead of the rotational movement of the chopper 192 relative to the stationary points 188 and 226. The description is made from the perspective of an observer rotating with the chopper 192.

When the chopper rotates clockwise with respect to FIG. 9, the point 188 moves counterclockwise on the sector 204, as indicated. Simultaneously, the point 226 reaches the sector 206, which is diametrically opposite. Sector 204 is transparent, sector 206 is reflecting. In this position of the chopper 192, the light beam 252 originating from the deuterium lamp transmits through the chopper 192 to the reference path of rays 244. The light beam 252 passes through the reference path of rays 244 as it was described above for the reference light beam 242. The reflecting sector 206 of the chopper 192 is located at the point 226. Therefore, after passing through the reference path of rays, the light beam 252 is reflected by the chopper 192 onto the concave mirror 228 and from there, like the measuring and the reference light beam from the line-emitting light source 180, is passed to the entrance slit 232 of the monochromator 234.

Upon further rotation of the chopper 192, the point 188 reaches the reflecting sector 200. Now, the light beam 182 from the line emitting light source 180 is reflected as reference light beam into the reference path of rays 244. At the point 226, the reference light beam is reflected by the sector 202 to the concave mirror 228.

Subsequently, transparent sectors 196 and 198 again pass through both points 188 and 226. Now, the point 188 is in the area of the sector 196 and the point 226 is in the area of the sector 198. The light beam 182 from the line-emitting light source 180 passes as measuring light beam 208 along the measuring path of rays and transmits at the point 226 to the concave mirror 228.

Next, the point 188 reaches the area of the reflecting sector 206. The diametrically opposite sector 204 at the point 226 is transparent. Therefore, the light beam 252 from the deuterium lamp is reflected into the measuring path of rays and, after passing through the sample area and transmitting through the chopper 192, is focused at the point 226 by the concave mirror 228 onto the entrance slit 232 of the monochromator 234.

Finally, the point 188 reaches the area of the reflecting sector 202. The point 226 reaches the area of the also reflecting, diametrically opposite sector 200. Now, the light beam 182 originating from the light source 180 is again reflected into the reference path of rays 224 and, finally, is reflected at the point 226 onto the concave mirror 228.

Thus, the following sequence of light beams results at the entrance slit 232 of the monochromator 234:

| Chopper Position | Hollow Cathode Lamp | Deuterium Lamp |
| --- | --- | --- |
| 1. | sample | — |
| 2. | reference | — |
| 3. | — | reference |
| 4. | sample | — |
| 5. | reference | — |
| 6. | — | sample |

The light beam from the line-emitting light source 180, a hollow cathode lamp, for example, is guided during each revolution of the chopper 192, twice along the measuring path of rays through the sample area ("sample"), and twice along the reference path of rays ("reference"). In between, the light beam 252 is guided from the deuterium lamp once along the reference path of rays and once along the measuring path of rays.

Figure 10:
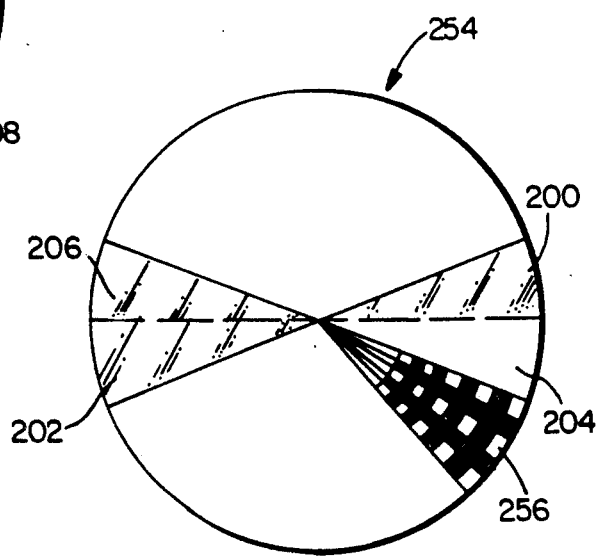
FIG. 10 Shows a modification of the chopper of FIG. 9.

FIG. 10 shows a modified chopper 254 which can take the place of the chopper 192 of FIG. 8. The chopper 254 has substantially the same sectors as the chopper 192. Corresponding sectors are designated in FIG. 10 by the same numerals as in FIG. 9. In addition to these sectors, a further sector 256 is provided which is semi-transparently reflecting. The chopper 254 can be provided in a stationary position in which this semi-transparent sector 256 is in the point 188. In this position, the chopper 254 acts like a simple beam splitter. The light beam 182 from the hollow cathode lamp or another line-emitting light source 180, as well as the light beam 252 from the deuterium lamp, are guided into the measuring path of rays. Half of the measuring light beam 182 transmits at the point 188 through the sector 256 of the chopper 254 and half of the light beam 252 is reflected by the sector 256 into the measuring path of rays. Both thus-formed partial light beams extend through the measuring path of rays and the sample area. Both partial light beams transmit at the point 226 through the sector 196. With this mode of operation, the hollow cathode lamp 180 and the deuterium lamp are alternatingly switched on.

The described arrangement can be modified such that the chopper is formed according to the type of FIG. 9. The chopper 192 of FIG. 9 is stopped in a fixed position in which the light beams 142 and 152 from the line-emitting light source both impinge on a transparent sector 196 or 198 or 204. A beam splitter (not illustrated) can be optionally move into the path of rays directly in front of the chopper 192. Then, the line-emitting light source 180 and a light source emitting a continuum generate light beams which congruently pass through the sample area 222. The light sources can again be electronically excited in an alternating fashion.

What is claimed is:

1. A double-beam photometer, comprising a light source projecting a light beam,
detector means,
a sample area,
optical means for guiding said light beam as a measuring light beam through said sample area onto said detector means,
means for guiding said light beam as a reference light beam onto said detector means while avoiding said sample area, and
chopper means disposed at a splitting location for splitting the light beam from said light source into a path of rays of said measuring light beam and into a path of rays of said reference light beam, with these paths of rays being recombined into a single path in a recombination location after the measuring light beam has passed through said sample area,
the splitting location and the recombination location being spatially close to each other, and
said chopper means having a single chopper which simultaneously effects the splitting and the recombination of the measuring and reference light beams.

2. Double-beam photometer, as set forth in claim 1, wherein said double-beam photometer is an atomic absorption spectrophotometer and the light source is a line-emitting hollow cathode lamp.

3. Double-beam photometer, as set forth in claim 2, wherein
said chopper is in at least one sector, reflecting and in at least one other sector, transparent,
said light beam originating from the light source impinges at the splitting location at an angle onto the surface of said chopper, and
said measuring light beam is also guided through the splitting location at the reflection angle associated with the angle, whereby the splitting location and the recombination location coincide.

4. Double-beam spectrophotometer, as set forth in claim 3, wherein
said light beam originating from said light source is focused by a first concave mirror in the splitting location on said chopper,
said measuring light beam transmitted through the transparent sector of the chopper is focused by a second concave mirror on said sample area, and
said measuring light beam, after passing through said sample area, is focused by a third concave mirror on said chopper in the splitting location.

5. Double-beam photometer, as set forth in claim 4, wherein the path of rays of the measuring light beam forms an equilateral triangle.

6. Double-beam photometer, as set forth in claim 5, further comprising
an exit slit
a fourth concave mirror which focuses said measuring light beam, transmitted through the transparent sector of said chopper, or said reference light beam, reflected by the reflecting sector of said chopper onto said exit slit.

7. Double-beam photometer, as set forth in claim 2, wherein
a light beam from said lamp emitting a spectral continuum is superimposed onto the path of rays by said single chopper to compensate for background.

8. Double-beam photometer, as set forth in claim 3, wherein
said light beam originating from said light source is reflected during a measuring phase and during the reference phase at a superimposing location by said reflecting sector of said chopper
said reflected light beam is guided back to the splitting location of said chopper during the measuring phase said transparent sector of said chopper runs through the splitting location and during the reference phase, a reflecting sector of the chopper runs through the splitting location during the measuring phase, and
during the background compensation phase, a transparent sector runs through the superimposing location and a transparent sector runs through the splitting location, and
said light beam from a light source emitting a continuum is guided in the same direction through the superimposing location in which the measuring and the reference light beams are reflected at this superimposing location by said chopper.

9. Double-beam photometer, as set forth in claim 2, wherein the splitting location and the recombination location are located on diametrically opposite sides of said chopper.

10. Double-beam photometer, as set forth in claim 7, wherein
a transparent sector of said chopper runs through the splitting location, and a reflecting sector of said chopper simultaneously runs through the recombination location with the measuring light beam being transmitted to the measuring path of rays and, after its passage through the sample area, is reflected by the reflecting sector in the direction of the detector means during the measuring phase
a reflecting sector of said chopper runs through the splitting location and a transparent sector of said chopper simultaneously runs through the recombination location, with the reference light beam being reflected into the reference path of rays, and transmitted through the transparent sector in alignment with the measuring light beam in the direction of the detector means during the reference phase.

11. Double-beam photometer, as set forth in claim 9, characterized in that
a transparent sector of said chopper runs through the splitting location and a transparent sector of said chopper simultaneously runs though the recombination location, with the measuring light beam being transmitted to the measuring path of rays and, after its passage through the sample area, being transmitted through the diametrically opposite sector in the direction of the detector means during the measuring phase
a reflecting sector of said chopper runs through the splitting location and a reflecting sector of said chopper simultaneously runs through the recombination location, with the reference light beam being reflected by the first sector into the reference path of rays, and, but the diametrically opposite, reflecting sector, being reflected in alignment with the measuring light beam in the direction of the detector means during the reference phase.

12. Double-beam photometer, as set forth in claim 11, wherein
said chopper has a transparent sector diametrically opposite of which is a reflecting sector, and
a light beam from a light source emitting a continuum is guided to the splitting location of said chopper which light beam is in alignment with the reference light beam reflected at the splitting location for background compensation.

13. Double-beam photometer, as set forth in claim 11, wherein each of the diametrically opposite, transparent sectors extends through an obtuse angle.

14. Double-beam photometer, as set forth in claim 13, wherein said chopper has a further semi-transparent sector said chopper can be stopped in a position in which the light beams from the line-emitting light source and from the light source emitting a continuum both impinge on the semi-transparent sector, and the line-emitting light source and the light source emitting a continuum, which light sources are electronically excited in an alternating fashion, generate light beams which congruently pass through the sample area.

15. Double-beam photometer, as set forth in claim 13, wherein said chopper can be stopped in a position in which the light beams from the line-emitting light source and from the light source emitting a continuum both impinge on a transparent sector beam splitter can be optionally moved into the path of rays in front of the chopper, and the line-emitting light source and the light source emitting a continuum, which light sources are electronically excited in an alternating fashion, generate light beams which congruently pass through the sample area.

* * * * *